(12) United States Patent
Schnorpfeil et al.

(10) Patent No.: US 10,578,035 B2
(45) Date of Patent: Mar. 3, 2020

(54) GAS FLOW CONTROL FOR AN INTERNAL COMBUSTION ENGINE

(71) Applicant: GM GLOBAL TECHNOLOGY OPERATIONS LLC, Detroit, MI (US)

(72) Inventors: Stephan-Johannes Schnorpfeil, Rheinboellen (DE); Benedikt Fuchs, Ginsheim-Gustavsburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 104 days.

(21) Appl. No.: 15/945,446

(22) Filed: Apr. 4, 2018

(65) Prior Publication Data
US 2018/0283297 A1     Oct. 4, 2018

(30) Foreign Application Priority Data

Apr. 4, 2017     (DE) .................. 10 2017 003 285

(51) Int. Cl.
| | |
|---|---|
| *F02D 41/00* | (2006.01) |
| *F02D 41/02* | (2006.01) |
| *F02M 26/34* | (2016.01) |
| *F02M 26/05* | (2016.01) |
| *F02M 26/10* | (2016.01) |
| *F01N 3/22* | (2006.01) |
| *F02M 26/00* | (2016.01) |

(52) U.S. Cl.
CPC ..... *F02D 41/0055* (2013.01); *F02D 41/0065* (2013.01); *F02D 41/0077* (2013.01); *F02D 41/025* (2013.01); *F02M 26/05* (2016.02); *F02M 26/10* (2016.02); *F02M 26/34* (2016.02); *F01N 3/22* (2013.01); *F02D 2041/0067* (2013.01); *F02M 2026/003* (2016.02); *F02M 2026/004* (2016.02); *F02M 2026/0025* (2016.02); *Y02T 10/26* (2013.01); *Y02T 10/47* (2013.01)

(58) Field of Classification Search
CPC ............... F02D 41/005; F02D 41/0065; F02D 41/0077; F02D 2041/0067; F02D 41/025; F02M 26/05; F02M 26/10; F02M 2026/0025; F02M 2026/003; F02M 2026/004; F02M 26/34; F02M 26/04; F02M 26/13; Y02T 10/26; Y02T 10/47; F01N 3/22; F01N 3/30; F02B 37/00
USPC ...................................... 60/605.1, 605.2, 611
See application file for complete search history.

(56) References Cited

U.S. PATENT DOCUMENTS

| | | | |
|---|---|---|---|
| 7,533,657 B2 * | 5/2009 | Onodera ............. | F02D 41/0055 123/559.2 |
| 2002/0069862 A1 * | 6/2002 | Faletti ................... | F02M 26/43 123/568.17 |

(Continued)

*Primary Examiner* — Hoang M Nguyen
(74) *Attorney, Agent, or Firm* — Lorenz & Kopf, LLP

(57) ABSTRACT

A gas flow control system is provided for at least one cylinder of an internal combustion of a motor vehicle. The gas flow control system includes a supply passage configured to supply gas to the cylinder and an exhaust gas passage configured to remove gas from the cylinder. A bypass passage is configured to connect the supply passage and exhaust gas passage, and a fluid control switch is selectively operable to supply gas out of the exhaust gas passage through the bypass passage into the supply passage in an exhaust gas return operating mode, and to supply gas out of the supply passage through the bypass passage into the exhaust gas passage in a post-air operating mode.

18 Claims, 3 Drawing Sheets

(56) References Cited

U.S. PATENT DOCUMENTS

| | | | |
|---|---|---|---|
| 2007/0107430 A1* | 5/2007 | Schmid | F02B 37/18 |
| | | | 60/612 |
| 2013/0008162 A1* | 1/2013 | Ruona | F01N 3/023 |
| | | | 60/605.1 |
| 2015/0308329 A1* | 10/2015 | Ulrey | F02B 37/16 |
| | | | 60/605.1 |
| 2017/0009709 A1* | 1/2017 | Cloos | F02D 41/005 |

* cited by examiner

GAS FLOW CONTROL FOR AN INTERNAL COMBUSTION ENGINE

CROSS-REFERENCE TO RELATED APPLICATION

This application claims priority to German Patent Application No. 102017003285.8, filed Apr. 4, 2018, which is incorporated herein by reference in its entirety.

TECHNICAL FIELD

The present disclosure pertains to a gas flow control for at least one cylinder of an internal combustion engine, a motor vehicle with an internal combustion engine and gas flow control, a method for optionally switching over the gas flow control, as well as a computer program product for implementing the method.

BACKGROUND

Modern engines employ various gas flow control for improved performance and operation of an internal combustion engine. For example, exhaust gas recirculation or EGR in an internal combustion engine is used to remove a portion of the exhaust gas stream downstream of the cylinders and introduce the portion of exhaust gas upstream of the cylinders. Conversely, post- or secondary air injection in an internal combustion engine is used to remove a portion of the combustion air, which may be fresh air or an air-fuel mixture, upstream of the cylinders and introduce the portion of combustion air downstream of the cylinders.

SUMMARY

The present disclosure presents certain improvements in a gas flow control for an internal combustion engine. In an embodiment of the present disclosure, a gas flow control for one or more, in particular for all, cylinders of an internal combustion engine of a motor vehicle includes at least one supply passage through which a combustion gas can be supplied to the cylinders. In an embodiment of the present disclosure, the gas flow control has at least one exhaust gas passage through which exhaust gas can be removed from the cylinder(s). The gas flow control has at least one bridge or bypass passage for connecting the supply passage upstream of the cylinders, and the exhaust gas passage downstream of the cylinder(s). A fluid control switch is operable in various modes for controlling fluid in the bypass passage. In an exhaust gas return operating mode, exhaust gas from the exhaust gas passage recirculated back to the supply passage as a function of an operating state of the internal combustion engine and/or an exhaust gas aftertreatment system. In a post-air operating mode, combustion air from the supply passage can be supplied into the exhaust gas passage via the same bypass passage.

In an embodiment, the bypass passage is fluidically arranged parallel to the cylinder(s) and configured to selectively connect the supply passage or exhaust gas passage while bypassing the other one. The bypass passage can selectively, depending on the operating point, return exhaust gas from the cylinder(s) back to the latter in the exhaust gas return operating mode for reducing pollutant emissions and/or fuel consumption, or supply fresh air alone or combined with fuel after the cylinder(s) in the post-air operating mode for oxidizing pollutants in the exhaust gas, such as hydrocarbons, and/or combust residual, to more rapidly heat a downstream exhaust gas aftertreatment device, and in turn reduce pollutant emissions, in particular during the (cold) startup of the internal combustion engine. As a result, assembly space, costs and/or weight, and thus in turn fuel in particular, can be economized by using the same bridging, in particular the same bypass passage, for both the return of exhaust gas and post- or secondary (fresh) air supply after the cylinder(s).

In an embodiment, the internal combustion engine is a gasoline engine, which represents an especially advantageous application. In another embodiment, the internal combustion engine is a diesel engine.

In an embodiment, the fluid control switch controls the gas flow in the bypass passage as a function of an operating state of the internal combustion engine and/or the aftertreatment device, and may also operate in a lockout mode in which flow through the bypass passage is blocked. As a result, flow losses and/or stresses on the bypass passage if neither an exhaust gas return nor a post- or secondary (fresh) air supply is enabled as a function of the operating state of the internal combustion engine and/or the exhaust gas aftertreatment device.

In an embodiment, the fluid control switch includes one or more pumps with which the gas can be conveyed in the exhaust gas return mode and/or in the post-air operating mode through the bypass passage, or which is configured to do so. As a result, it is possible to realize a desired forced flow or (through) flow direction against an opposing pressure drop or even without a pressure drop generating it (to a desired extent) between the exhaust gas passage and supply passage, or support a pressure drop in the exhaust gas return operating mode and/or in the post-air operating mode.

In an embodiment, a conveying direction of the pump is reversible by switching between the exhaust gas return and post-air operating mode. As a result, an opposing flow through the bypass passage, can hereby be realized or supported.

In an embodiment, the pump can likewise also have just one uniform or fixed conveying direction. In a further development, an opposing flow through the bypass passage, can then be realized by corresponding multiport valves, for example by a one way valve with varying flow paths, with which the inlets and/or outlets of the pump can be connected with the supply or exhaust gas passage. In an embodiment, the pump may likewise act only in the exhaust gas return operating mode or only in the post-air operating mode, and be passive or non-driven in the other operating mode or be fluidically bridged.

In an embodiment, the fluid control switch may include one or more control valves for optionally closing or blocking the bypass passage, and/or inlets and/or outlets of the pump. In an embodiment, the fluid control switch additionally or alternatively may include one or more, in particular opposing and/or parallel, check valves. Both such valves and correspondingly controllable pumps can be used to realize a desired (direction of) flow in the bypass passage.

In an embodiment, the gas flow control may include at least one heat exchanger, which can cool gas flowing through the bypass passage, in particular exhaust gas from the exhaust gas passage, at least in the exhaust gas return operating mode. As a result, it is possible to further reduce pollutant emissions and/or fuel consumption. In a further development, the heat exchanger is arranged upstream before an inlet of the pump or the pump is arranged on the cold side or downstream after an outlet of the heat exchangers, so that the pump is advantageously exposed only to cooled gas.

In an embodiment, the gas flow control includes at least one exhaust gas aftertreatment device, such as a catalytic converter, and the exhaust gas passage is configured to supply gas to the exhaust gas aftertreatment device. As a result it is possible to further reduce pollutant emissions and/or fuel consumption.

In an embodiment, the gas flow control includes at least one compressor for increasing the pressure in the supply passage. In a further development, the bypass passage is connected with the supply passage upstream before the compressor or downstream after the compressor. In an embodiment, the gas flow control additionally or alternatively includes at least one turbine that is driven by exhaust gas in the exhaust gas passage for driving the compressor. In a further development, the bypass passage is connected with the exhaust gas passage upstream before the turbine or downstream after the turbine. As a result, it is possible to realize in particular a so-called high-pressure exhaust gas return, in which exhaust gas is removed before the turbine under a higher pressure and returned after the compressor, a so-called low-pressure exhaust gas return, in which exhaust gas is removed after the turbine under a low pressure and returned before the compressor, or also a combination hereof, in particular using the at least one pump.

In an embodiment of the present disclosure, the gas flow control, in particular the fluid control switch and/or the bypass passage, is optionally switched into the exhaust gas return operating mode and into the post-air operating mode as a function of an operating state of the internal combustion engine and/or exhaust gas aftertreatment device. The gas flow control is operated in the exhaust gas return operating mode when a one or more dimensional operating parameter of the internal combustion engine and/or exhaust gas aftertreatment device, such as one or more temperatures, a combustion air ratio λ of combustion air to fuel, a torque and/or a rotational speed of the internal combustion engine, fall within an exhaust gas return range. The gas flow control is operated in the post-air operating mode when the operating parameter fall within a post-air range differing from the exhaust gas return range. In an embodiment, the gas flow control correspondingly has a controller configured to switch the fluid control switch and/or the bypass passage into the exhaust gas return operating mode and into the post-air operating mode as a function of an operating state of the internal combustion engine and/or the exhaust gas aftertreatment device. The controller is configured to implement the methods described herein in terms of hardware and/or software as programmed technology.

In an embodiment, the controller can switch into the post-air operating mode given a (cold) startup of the internal combustion engine or a cold exhaust aftertreatment device or for purposes of heating the latter, and/or into the exhaust gas return operating mode in a partial-load range of the internal combustion engine (given a warm exhaust gas aftertreatment device).

Within the meaning of the present disclosure, various components of the gas flow control described herein may be computer-implemented including hardware and/or software, in particular have an electronic control unit or ECU including microprocessor signal-connected with a memory and/or bus system, and/or one or more programs or program modules. The microprocessor can be designed to process commands implemented as a program stored in a memory system, acquire input signals from a data bus or sensor and/or send output signals to a data bus. A memory system can have one or more, in particular different, memory media, in particular optical, magnetic, solid state and/or other nonvolatile media. The program can be constituted in such a way as to embody or be capable of implementing the method described herein, so that the microprocessor can execute the steps in such a method, and thus in particular can control the gas flow control or its fluid control switch. In an embodiment, one or more, in particular all, the execution of steps in the method is completely or partially automated, in particular by the controller.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
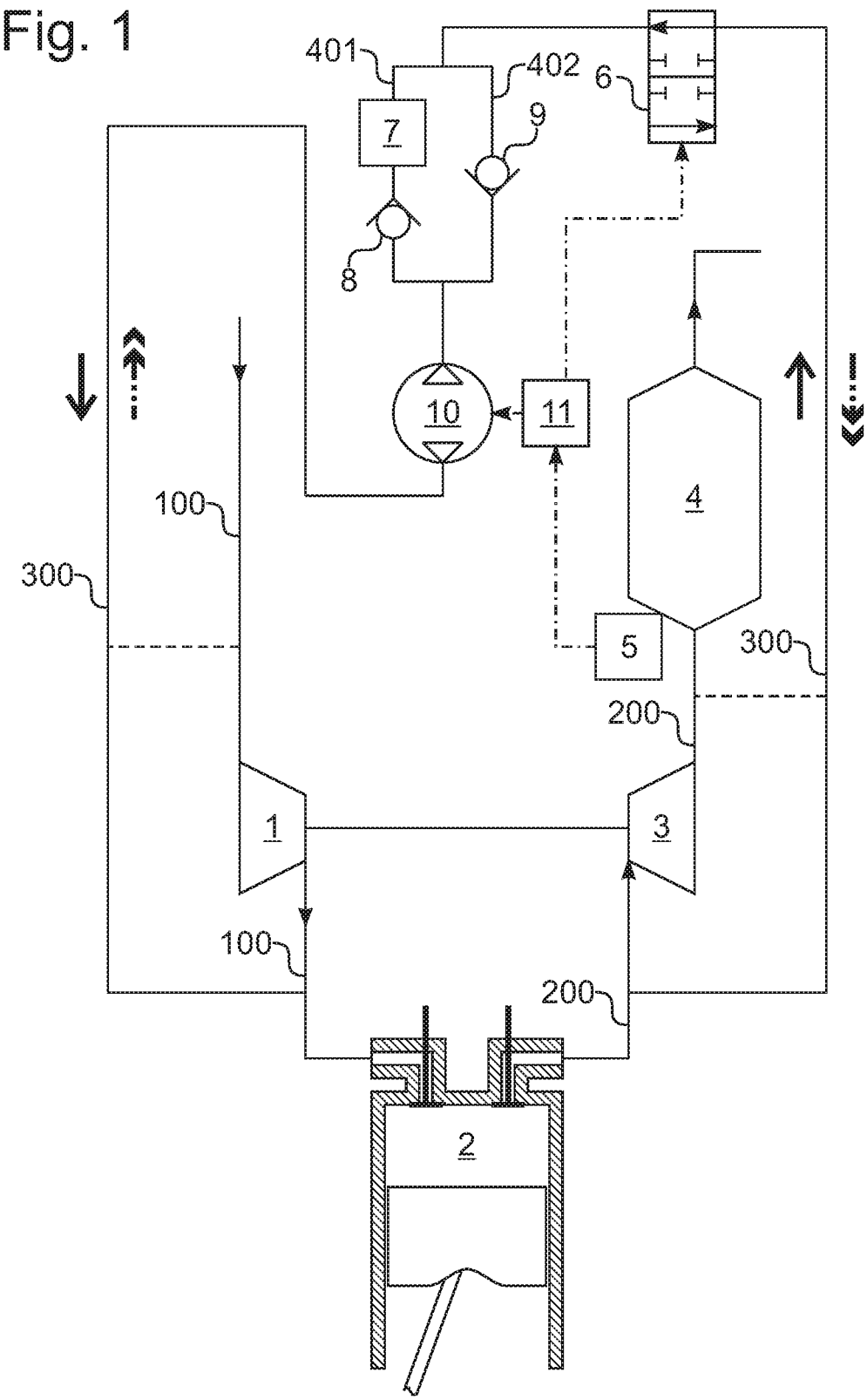
FIG. 1 schematically illustrates a gas flow control according to an embodiment of the present disclosure.

FIG. 1 shows a gas flow control for several cylinders 2 of an internal combustion engine according to an embodiment of the present disclosure. The gas flow control includes at least one supply passage 100 for supplying combustion air to the cylinders 2, at least one exhaust gas passage 200 for removing exhaust gas from the cylinders 2, a turbocharger with a compressor 1 for increasing the pressure in the supply passage 100, a turbine 3 that can be driven by exhaust gas in the exhaust gas passage 200 for driving the compressor 1, and an aftertreatment device 4 such as a catalytic converter, which follows the exhaust gas passage 200, so that the latter supplies exhaust gas to it, or the exhaust gas passage 200 is set up to do so.

The gas flow control further includes at least one bypass passage 300 for connecting the supply passage 100 upstream before the cylinders 2 and the exhaust gas passage 200 downstream after the cylinders 2, and a fluid control switch configured to switch the gas flow control into an exhaust gas return operating mode for supplying gas from the exhaust gas passage 200 through this bypass passage 300 into the supply passage 100 and into a post-air operating mode for supplying gas from the supply passage 100 through the same bypass passage 300 into the exhaust gas passage 200. In an embodiment, the fluid control switch includes a control valve 6, which is controlled by an electronic control unit 11. The fluid control switch further has a pump for 10 for conveying gas through the bypass passage 300, the conveying direction of which in the exemplary embodiment on FIG. 1 is reversible, and also controlled by the electronic control unit 11. The control valve 6 and pump 10 are connected by two fluidically parallel branches 401, 402 with oppositely acting check valves 8, 9, so that only one of the respective two branches 401, 402 carries a flow.

A heat exchanger 7 for cooling exhaust gas is arranged in the branch 401.

In an embodiment, the bypass passage 300 is connected downstream after the compressor 1 with the supply passage 100 and upstream before the turbine 3 with the exhaust gas passage 200, as denoted by solid lines on FIG. 1.

Alternately, the bypass passage 300 can be connected upstream before the compressor 1 with the supply passage 100 and/or downstream after the turbine 3 with the exhaust gas passage 200, as denoted by dashed lines on FIG. 1. Then, a high-pressure exhaust gas return (solid line on FIG. 1) or a low-pressure exhaust gas return (dashed line on FIG. 1) or a combination of high- and low-pressure exhaust gas return can be realized.

The electronic control unit 11 receives operating states, in particular operating parameters, of the internal combustion engine and/or aftertreatment device 4, from one or more sensors. The exemplary embodiment presents an example for a aftertreatment device temperature or lambda sensor 5, wherein in particular a MAP sensor (manifold absolute pressure sensor) can additionally or alternatively also be used to acquire the absolute pressure in the supply passage 100.

The electronic control unit 11 implements a method hereinafter described with reference to FIG. 2 to switch the fluid control switch including valve 6 and/or pump 10.

At block S10, the electronic control unit 11 checks whether an exhaust gas return operating mode should be implemented based on the operating state of the internal combustion engine and/or aftertreatment device 4 as determined by the sensor(s). For example, this can be the case during partial load operation given a warm aftertreatment device 4.

If an exhaust gas return operating mode is to be implemented (S10: "Y"), the electronic control unit 11 switches into an exhaust gas return operating mode, in which the gas flow control opens the control valve 6 and actuates the pump 10 to convey exhaust gas from the exhaust gas passage 200 through the bypass passage 300 into the supply passage 100 at block S20.

This is denoted on FIG. 1 by solid (direction of) flow arrows. As evident, exhaust gas flows out of the exhaust gas passage 200 through the bypass passage 300 and branch 401, in which the heat exchanger 7 cools the exhaust gas, into the supply passage 100. The electronic control unit 11 or method then reverts to block S10 once again.

If an exhaust gas return operating mode is not to be implemented based on the operating state of the internal combustion engine and/or aftertreatment device 4 as determined by the sensor(s) (S10: "N"), the electronic control unit 11 checks whether a post-air operating mode is to be implemented based on the operating state of the internal combustion engine and/or aftertreatment device 4 as determined by the sensor(s) at block S30. For example, this can be the case when starting up the internal combustion engine given a cold aftertreatment device 4.

If a post-air operating mode is to be implemented (S30: "Y"), the electronic control unit 11 switches into a post-air operating mode, in which it opens the control valve 6, but conversely actuates the pump 10 to convey combustion air out of the supply passage 100 through the bypass passage 300 into the exhaust gas passage 200 (S40). This is denoted on FIG. 1 by dual dash-double-dotted (direction of) flow arrows. As evident, combustion air is conveyed by the pump 10 out of the supply passage 100 through the bypass passage 300 and branch 402 into the exhaust gas passage 200. The electronic control unit 11 or method then reverts back to block S10 once again.

If a post-air operating mode is not to be implemented either based on the operating state of the internal combustion engine and/or aftertreatment device 4 as determined by the sensor(s) (S10, S30: "N"), the electronic control unit 11 switches to a locking mode, in which the control valve 6 is closed and the pump 10 is shut down at block S50. The electronic control unit 11 or method then reverts back to block S10 once again.

Figure 3:
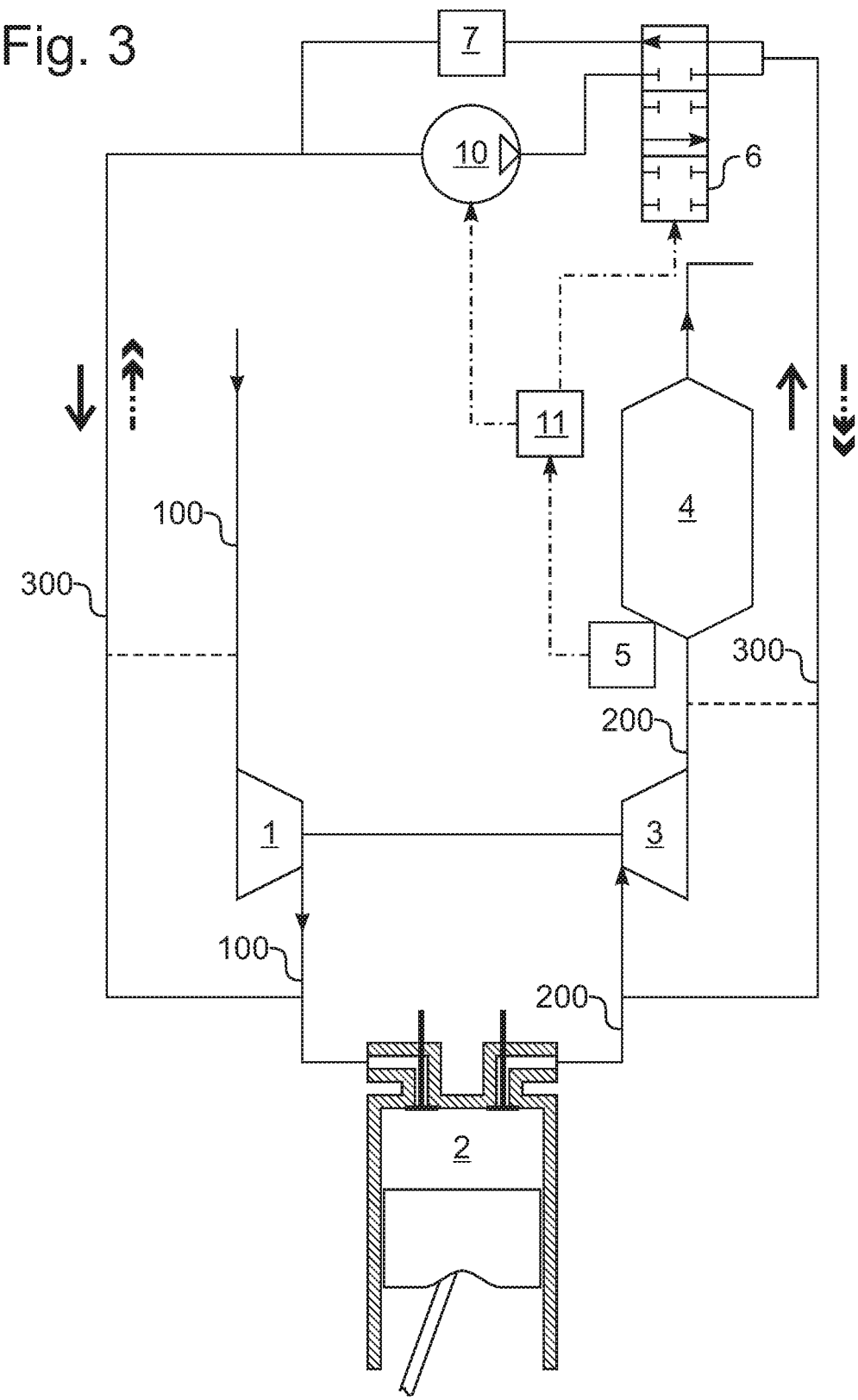
FIG. 3 schematically illustrates a gas flow control according to another embodiment of the present disclosure.

FIG. 3 shows a gas flow control for several cylinders 2 of an internal combustion engine according to another embodiment of the present disclosure. Features corresponding to the embodiment on FIG. 1 are identified by identical reference numbers, so that reference is made to the preceding description, and only differences will be discussed below.

In the embodiment on FIG. 3, the conveying direction and pump 10 are fixed. In addition, the control valve 6 is a 4/3 way valve having three switching positions: in a first switching position depicted on FIG. 3, an inlet of the heat exchangers 7 is connected via the bypass passage 300 with the exhaust gas passage 200, and an outlet blocks any flow through the pump 10. In an alternative second switching position, the outlet of the pump 10 is connected with the exhaust gas passage 200, and the inlet of, and thus the flow through, the heat exchangers 7 is blocked, and in an alternative third switching position, both the inlet of the heat exchangers 7 and the outlet of the pump 10 are blocked (off) against/by the exhaust gas passage 200.

Figure 2:
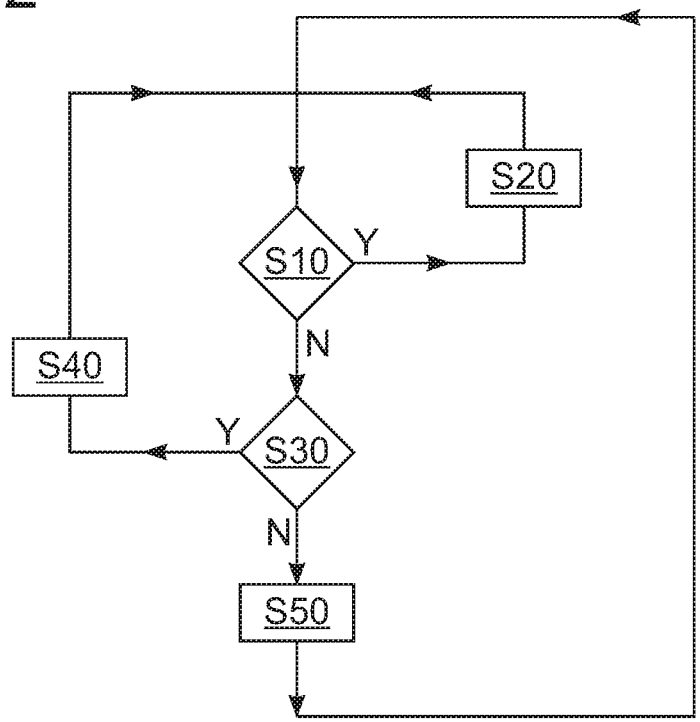
FIG. 2 is a flow chart illustrating a method for switching a fluid control switch of the gas flow control according to an embodiment of the present disclosure.

In the exhaust gas return operating mode (FIG. 2: S20), the electronic control unit 11 switches the control valve 6 into the first switching position depicted on FIG. 1, while the pump 10 is not driven, so that exhaust gas flows out of the exhaust gas passage 200 through the bypass passage 300 and heat exchanger 7 into the supply passage 100 owing to the pressure difference.

In the post-air operating mode (FIG. 2: S40), the electronic control unit 11 switches the control valve 6 into the second switching position, and actuates the pump 10 to convey the combustion air out of the supply passage 100 through the bypass passage 300 into the exhaust gas passage 200.

In the lockout operating mode (FIG. 2: S50), the electronic control unit 11 locks the control valve 6 into the third switching position, and shuts down the pump 10.

Even though exemplary embodiments were described in the above specification, let it be noted that a plurality of modifications are possible. For example, instead a pump with a reversible conveying direction, a pump with a fixed conveying direction can convey gas through the bypass passage 300 in both the exhaust gas return operating mode and in the post-air operating mode by having control valves optionally connect an inlet and an outlet of the pump with the supply passage 100 and exhaust gas passage 200.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A gas flow control system for at least one cylinder of an internal combustion of a motor vehicle comprising:

a supply passage configured to supplying a combustion fluid to the cylinder;

an exhaust gas passage configured for removing an exhaust gas from the cylinder;

a bypass passage in fluid communication with the supply passage and the exhaust gas passage;

a fluid control switch configured to selectively control gas flow in the bypass passage, the fluid control switch including a pump;

an electronic control unit configured to selectively operate the fluid control switch in an exhaust gas return operating mode or a post-air operating mode as a function of an operating state of the internal combustion engine;

wherein the flow control switch is operable in the exhaust gas return operating mode for supplying exhaust gas from the exhaust gas passage through the bypass passage and into the supply passage, or in the post-air operating mode for supplying combustion fluid from the supply passage through the bypass passage and into the exhaust gas passage; and wherein the pump conveys at least one of the exhaust gas through the bypass passage in the exhaust gas return operating mode and the combustion fluid through the bypass passage in the post-air operating mode.

2. The gas flow control system according to claim 1, wherein the fluid control switch is further operable in a lockout operating mode, wherein flow through the bypass passage is blocked.

3. The gas flow control system according to claim 1, wherein the pump comprises a reversible pump for selectively changing a conveying direction of the pump.

4. The gas flow control system according to claim 3, wherein the fluid control switch comprises at least one control valve.

5. The gas flow control system according to claim 1, wherein the fluid control switch comprises at least one control valve.

6. The gas flow control system according to claim 1, further comprising a heat exchanger configured to cool exhaust gas directed through the bypass passage in the exhaust gas return operating mode.

7. The gas flow control system according to claim 1, further comprising an exhaust gas aftertreatment device, wherein the exhaust gas passage is configured to supply exhaust gas to the exhaust gas aftertreatment device.

8. The gas flow control system according to claim 1, further comprising a compressor in fluid communication with the supply passage and configured to increase a pressure of the combustion fluid flowing therein.

9. The gas flow control system according to claim 8, wherein the bypass passage is connected with the supply passage upstream of the compressor.

10. The gas flow control system according to claim 8, further comprising a turbocharger including the compressor and a turbine configured to be driven by exhaust gas in the exhaust gas passage and to drive the compressor.

11. The gas flow control system according to claim 10, wherein the bypass passage is connected with the exhaust gas passage upstream of the turbine.

12. A motor vehicle comprising:
an internal combustion engine having at least one cylinder;
a supply passage configured for supplying a combustion fluid to the cylinder;
an exhaust gas passage configured for removing an exhaust gas from the cylinder;

a gas flow control system including a bypass passage in fluid communication with the supply passage and the exhaust gas passage, and a fluid control switch configured to selectively control gas flow in the bypass passage, the fluid control switch having a pump and at least one control valve;

an electronic control unit configured to selectively operate the fluid control switch in an exhaust gas return operating mode or in a post-air operating mode as a function of an operating state of the internal combustion engine;

wherein the flow control switch is operable in the exhaust gas return operating mode for supplying exhaust gas from the exhaust gas passage through the bypass passage and into the supply passage, and wherein the flow control switch is operable in the post-air operating mode for supplying combustion fluid from the supply passage through the bypass passage and into the exhaust gas passage; and wherein the pump is operable for at least one of conveying exhaust gas through the bypass passage in the exhaust gas return operating mode and conveying combustion fluid through the bypass passage in the post-air operating mode.

13. A method of operating a gas flow control system for controlling gas flow in an internal combustion engine (ICE), the method comprising:
receiving, by an electronic control unit (ECU) from at least one sensor, an operating parameter of the ICE;
determining, by the ECU, whether the ICE is in one of a first operating state and a second operating state, the second operating state being different from the first operating state;
operating, by the ECU, a gas flow control system in an exhaust gas return operating mode based on the determination that the ICE is in the first operating state, including supplying exhaust gas from an exhaust gas passage through a bypass passage and into a supply passage;
operating, by the ECU, the gas flow control system in a post-air operating mode based on the determination that the ICE is in the second operating state, including supplying combustion fluid from the supply passage through the bypass passage and into the exhaust gas passage, wherein the second operational state is different than the first operational state; and
wherein at least one of operating the gas flow control system in the exhaust gas return operating mode and operating the gas flow control system in the post-air operating mode includes pumping a pump to convey the one of the exhaust gas and the combustion fluid through the bypass passage.

14. The gas flow control system of claim 1, wherein the pump conveys the exhaust gas through the bypass passage in the exhaust gas return operating mode, and wherein the pump conveys the combustion fluid through the bypass passage in the post-air operating mode.

15. The gas flow control system of claim 1, further comprising a turbocharger, the turbocharger including a compressor and a turbine, the compressor in fluid communication with the supply passage and configured to increase a pressure of the combustion fluid flowing therein, the turbine configured to be driven by exhaust gas in the exhaust gas passage and to drive the compressor;
wherein the bypass passage is connected with the supply passage downstream of the compressor; and
wherein the bypass passage is connected with the exhaust gas passage upstream of the turbine.

16. The motor vehicle of claim 12, wherein the pump conveys the exhaust gas through the bypass passage in the exhaust gas return operating mode, and wherein the pump conveys the combustion fluid through the bypass passage in the post-air operating mode.

17. The motor vehicle of claim 12, further comprising a turbocharger, the turbocharger including a compressor and a turbine, the compressor in fluid communication with the supply passage and configured to increase a pressure of the combustion fluid flowing therein, the turbine configured to be driven by exhaust gas in the exhaust gas passage and to drive the compressor;
- wherein the bypass passage is connected with the supply passage downstream of the compressor; and
- wherein the bypass passage is connected with the exhaust gas passage upstream of the turbine.

18. The method of claim 13, wherein both of operating the gas flow control system in the exhaust gas return operating mode and operating the gas flow control system in the post-air operating mode includes pumping the pump to convey the respective one of the exhaust gas and the combustion fluid through the bypass passage.

* * * * *